United States Patent
Diab et al.

(10) Patent No.: US 9,405,571 B2
(45) Date of Patent: Aug. 2, 2016

(54) METHOD AND SYSTEM FOR ABSTRACTING VIRTUAL MACHINES IN A NETWORK COMPRISING PLURALITY OF HYPERVISOR AND SUB-HYPERVISORS

(71) Applicant: Broadcom Corporation, Irvine, CA (US)

(72) Inventors: Wael Diab, San Francisco, CA (US); Bruce Currivan, Dove Canyon, CA (US); Jeyhan Karaoguz, Irvine, CA (US); Yongbum Kim, San Jose, CA (US); Kenneth Ma, Cupertino, CA (US); Michael Johas Teener, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 233 days.

(21) Appl. No.: 14/026,785

(22) Filed: Sep. 13, 2013

(65) Prior Publication Data

US 2014/0013328 A1    Jan. 9, 2014

Related U.S. Application Data

(63) Continuation of application No. 12/571,296, filed on Sep. 30, 2009, now Pat. No. 8,566,822.

(60) Provisional application No. 61/227,665, filed on Jul. 22, 2009.

(51) Int. Cl.
  *G06F 9/455* (2006.01)
  *G06F 9/50* (2006.01)
  *G06F 9/46* (2006.01)
  *G06F 15/177* (2006.01)

(52) U.S. Cl.
  CPC .......... *G06F 9/45558* (2013.01); *G06F 9/5077* (2013.01); *G06F 9/46* (2013.01); *G06F 15/177* (2013.01); *G06F 2009/4557* (2013.01)

(58) Field of Classification Search
  None
  See application file for complete search history.

(56) References Cited

U.S. PATENT DOCUMENTS

| | | |
|---|---|---|
| 7,853,958 B2 | 12/2010 | Mathew et al. |
| 7,865,893 B1 | 1/2011 | Omelyanchuk et al. |
| 7,865,899 B2 | 1/2011 | Kawamoto et al. |
| 8,010,763 B2 | 8/2011 | Armstrong et al. |
| 8,069,233 B2 | 11/2011 | Matthews et al. |
| 8,166,474 B1 * | 4/2012 | Delco .................. G06F 9/45558 709/226 |
| 8,352,608 B1 | 1/2013 | Keagy et al. |
| 8,458,717 B1 | 6/2013 | Keagy et al. |
| 2003/0097393 A1 * | 5/2003 | Kawamoto ............ G06F 9/5077 718/1 |

(Continued)

*Primary Examiner* — Abu Ghaffari
(74) *Attorney, Agent, or Firm* — Brinks Gilson & Lione

(57) ABSTRACT

One or more processors and/or one or more circuits may be operable to configure one or more virtual machines and a hypervisor for controlling the one or more virtual machines. The virtual machines and the hypervisor may be distributed across a plurality of network devices. A sub-hypervisor may be configured within each of the virtual machines utilizing the hypervisor. Load information of the network devices may be communicated to the hypervisor utilizing the sub-hypervisors. The virtual machines may include threads, may be load balanced utilizing the hypervisor, dynamically configured utilizing the hypervisor based on changes in the network devices, and scaled by the distribution of the virtual machines across the network devices. Information from the processing of data may be received in the virtual machines. The network devices may include a plurality of: servers, switches, routers, racks, blades, mainframes, personal data assistants, smart phones, desktop computers, and/or laptop devices.

16 Claims, 4 Drawing Sheets

(56) References Cited

U.S. PATENT DOCUMENTS

| | | |
|---|---|---|
| 2006/0123416 A1 | 6/2006 | Cibrario Bertolotti et al. |
| 2007/0162572 A1 | 7/2007 | Aloni et al. |
| 2007/0244972 A1 | 10/2007 | Fan |
| 2008/0141264 A1* | 6/2008 | Johnson ............... G06F 9/455 718/105 |
| 2008/0163239 A1* | 7/2008 | Sugumar ............. G06F 9/5088 718/105 |
| 2009/0037682 A1* | 2/2009 | Armstrong .......... G06F 12/1475 711/164 |
| 2009/0172661 A1 | 7/2009 | Zimmer et al. |
| 2009/0222558 A1 | 9/2009 | Xu et al. |
| 2009/0287571 A1 | 11/2009 | Fujioka |
| 2009/0292858 A1 | 11/2009 | Lambeth et al. |
| 2009/0328038 A1* | 12/2009 | Yamada ................ G06F 9/5077 718/1 |
| 2010/0107162 A1* | 4/2010 | Edwards .............. G06F 9/5077 718/1 |

\* cited by examiner

METHOD AND SYSTEM FOR ABSTRACTING VIRTUAL MACHINES IN A NETWORK COMPRISING PLURALITY OF HYPERVISOR AND SUB-HYPERVISORS

CROSS REFERENCE TO RELATED APPLICATIONS

This application is a continuation of U.S. patent application Ser. No. 12/571,296, filed Sep. 30, 2009, pending, which claims priority to provisional application Ser. No. 61/227,665, filed Jul. 22, 2009, which applications are incorporated by reference in their entirety.

TECHNICAL FIELD

Certain embodiments of the invention relate to wireless communication. More specifically, certain embodiments of the invention relate to a method and system for abstracting virtual machines in a network.

BACKGROUND

In networking systems, a single machine, for example, a server or a client, may be utilized to concurrently support multiple server operations or services. For example, a single server may be utilized for providing access to business applications while also operating as an email server, a database server, and/or an exchange server. The server may generally support the various server operations by utilizing a single operating system (OS). The server operations, via the single OS, make use of server processing resources such as the central processing unit (CPU), memory, network interface card (NIC), peripheral sound card, and/or graphics card, for example. In many instances, the server resources may not be efficiently utilized because the demand for server operations generally vary based on the type of service provided and/or user needs. Consolidating server services into a single physical machine may result in an improvement in server efficiency. However, consolidation also removes the level of protection that is provided when the operations are maintained separately. For example, when the operations are consolidated, a crash or failure in a database server may also result in the loss of email services, exchange services, and/or application services.

Another approach for improving server efficiency may be to utilize multiple operating systems running concurrently so that each operating system supports a different server operation or application or service, for example. The multiple operating systems may be referred to as guest operating systems (GOSs) or child partitions. This approach maintains the level of protection provided when server operations are not consolidated under a single operating system while also enabling the optimization of the usage of the processing resources available to the server. The use of multiple guest operating systems may be referred to as OS virtualization because each GOS perceives to have full access to the server's hardware resources. In this regard, a GOS is unaware of the presence of any other GOS running on the server. In order to implement OS virtualization, a software layer may be utilized to arbitrate access to the server's hardware resources. This software layer may be referred to as a hypervisor or virtual machine (VM) monitor, for example. The hypervisor may enable the multiple GOSs to access the hardware resources in a time-sharing manner. This software layer may be assisted by a trusted GOS (TGOS), which may also be referred to as a parent partition, or Virtual Machine Kernel (VMK) for instance.

The NIC may be a hardware resource that is frequently utilized by at least one of the server operations or services. In this regard, a hypervisor or VM monitor may enable creation of a software representation of the NIC that may be utilized by a GOS. This software representation of the NIC may be referred to as a "virtual NIC." However, a virtual NIC may not be able to offer a full set of features or functionalities of the hardware NIC to a GOS. For example, a virtual NIC may only be able to provide basic layer 2 (L2) networking functionality to a GOS. The virtual NIC may be limited to providing data communication between a GOS and the network through another SW entity, such as a TGOS or VMK. In this regard, the virtual NIC may not be able to support other advanced features such as remote direct memory access (RDMA) and/or Internet small computers system interface (iSCSI), directly to the GOS for example. Additionally, data may be copied among a plurality of buffers prior to transmission to a network by the NIC or after reception from a network by the NIC. The copying of data may be an overhead to, for example, a host processor.

Further limitations and disadvantages of conventional and traditional approaches will become apparent to one of skill in the art, through comparison of such systems with the present invention as set forth in the remainder of the present application with reference to the drawings.

BRIEF SUMMARY

A system and/or method for abstracting virtual machines in a network, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION

Certain aspects of the invention may be found in a method and system for abstracting virtual machines in a network. In various exemplary aspects of the invention, one or more processors and/or one or more circuits may be operable to configure one or more virtual machines and a hypervisor for controlling the one or more virtual machines. The one or more virtual machines and the hypervisor may be distributed across the plurality of network devices. A sub-hypervisor may be configured within each of the one or more virtual machines utilizing the hypervisor. Load information for the networked devices may be communicated to the hypervisor utilizing the sub-hypervisors. The one or more virtual machines may comprise one or more threads. The one or more virtual machines may be load balanced utilizing the hypervisor. The one or more virtual machines may be dynamically configured utilizing the hypervisor based on changes in the network devices and may be scaled by the distribution of the one or more virtual machines across the plurality of network devices. The one or more virtual machines may comprise an operating system. The network devices may comprise a plurality of: servers, switches, routers, racks, blades, mainframes, personal data assistants, smart phones, desktop computers, and/or laptop devices.

Figure 1:
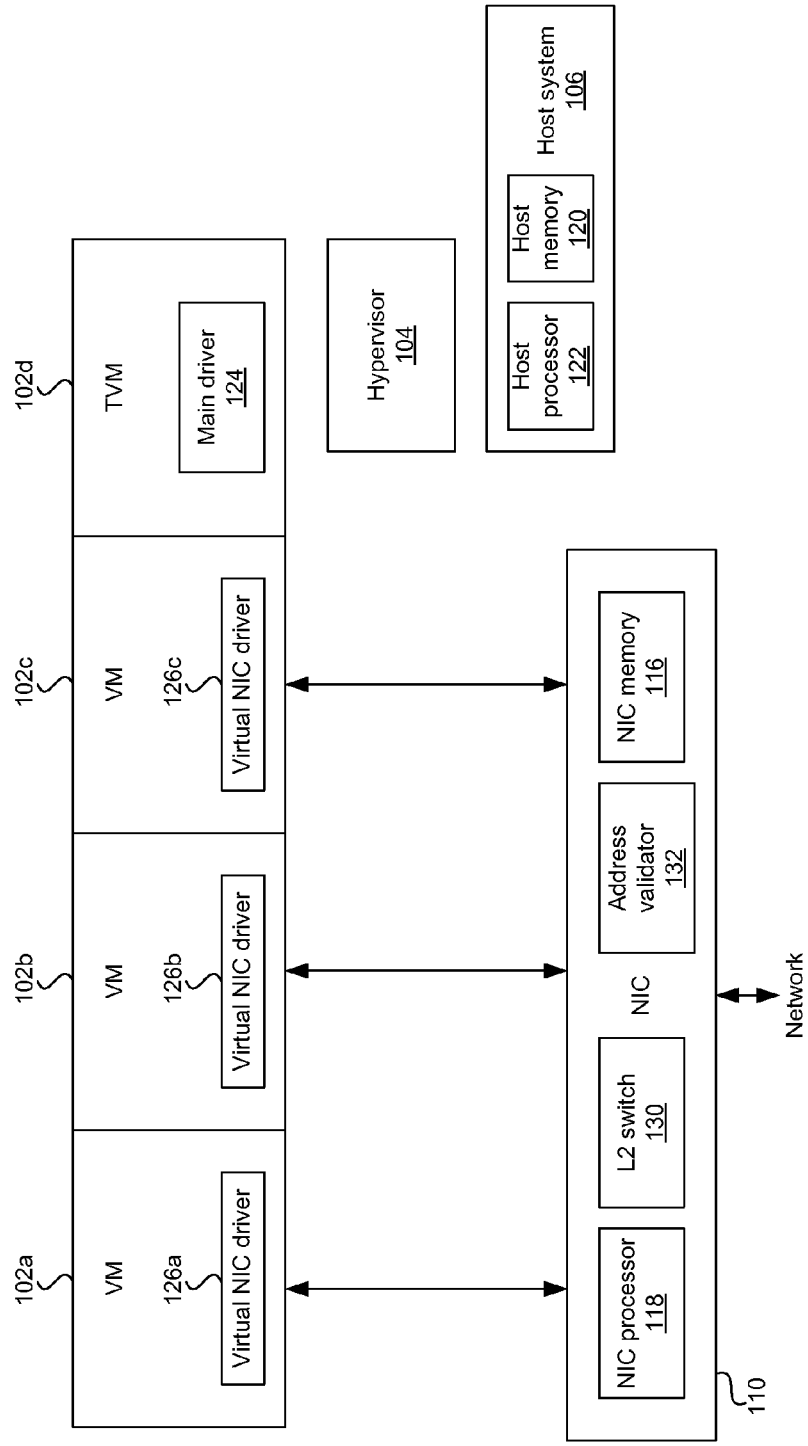
FIG. 1 is a block diagram of a single host system virtual machine implementation, which may be utilized in connection with an embodiment of the invention.

FIG. 1 is a block diagram of a single host system virtual machine implementation, which may be utilized in connection with an embodiment of the invention. Referring to FIG. 1, there is shown an exemplary network interface card (NIC) 110 that supports level 2 (L2) switching and/or higher layer of switching for communication between virtual machines (VMs) in a host system. The switching supported by the NIC 110 need not be limited to L2 only, and may be any combination of L2, VLAN, L3, L4, higher protocol layer and/or additional information including from the administrator as to how to perform the switching. There is also shown virtual machines (VMs) 102a, 102b, and 102c, a transfer virtual machine (TVM) 102d, a hypervisor 104, a host system 106, and a NIC 110. The TVM 102d may comprise a main driver 124. The host system 106 may comprise a host processor 122 and a host memory 120. The NIC 110 may comprise a NIC processor 118, a NIC memory 116, a L2 switch 130, and a physical address validator 132.

The host system 106 may comprise suitable logic, circuitry, interfaces, and/or code that may enable data processing and/or networking operations, for example. In some instances, the host system 106 may also comprise other hardware resources such as a graphics card and/or a peripheral sound card, for example. The host system 106 may support the operation of the VMs 102a, 102b, and 102c via the hypervisor 104. The VMs 102a, 102b, and 102c may each correspond to an operating system, for example, that may enable the running or execution of operations or services such as applications, email server operations, database server operations, and/or exchange server operations, for example. The number of VMs that may be supported by the host system 106 by utilizing the hypervisor 104 need not be limited to any specific number. For example, one or more VMs may be supported by the host system 106. Internal switching may occur between VMs or between a VM and the TVM 102d.

The hypervisor 104 and/or the TVM 102d may operate as a software layer that may enable virtualization of hardware resources in the host system 106 and/or virtualization of hardware resources communicatively connected to the host system 106, such as the NIC 110, for example. The hypervisor 104 and/or the TVM 102d may allocate hardware resources and also may enable data communication between the VMs and hardware resources in the host system 106 and/or hardware resources communicatively connected to the host system 106. For example, the hypervisor 104 may enable communication between the VMs supported by the host system 106 and the NIC 110. In instances where a relevant VM is engaged in network transmission or reception, data may travel directly to/from the NIC after the TVM 102d has allocated queues, internal resources required on the NIC, consulted with the configuration and administrative information.

The TVM 102d may comprise a main driver 124 that may coordinate the transfer of data between the VMs. The main driver 124 may communicate with the virtual NIC driver 126a in the VM 102a, the virtual NIC driver 126b in the VM 102b, and/or the virtual NIC driver 126c in the VM 102c. Each virtual NIC driver may correspond to a portion of a VM that may enable transfer of data between the operations or services performed by the VMs and the appropriate queues via the main driver 124.

The host processor 122 may comprise suitable logic, circuitry, interfaces, and/or code that may be operable for control and/or management of the data processing and/or networking operations associated with the host system 106. The host memory 120 may comprise suitable logic, circuitry, and/or code that may enable storage of data utilized by the host system 106. The host memory 120 may be partitioned into a plurality of memory portions. For example, each VM supported by the host system 106 may have a corresponding memory portion in the host memory 120. Moreover, the hypervisor 104 may have a corresponding memory portion in the host memory 120. In this regard, the hypervisor 104 and/or the TVM 102d may enable data communication between VMs by controlling the transfer of data from a portion of the memory 120 that corresponds to one VM to another portion of the memory 120 that corresponds to another VM.

The NIC 110 may comprise suitable logic, circuitry, interfaces, and/or code that may enable communication of data with a network. The NIC 110 may enable basic L2 switching, VLAN based switching, TCP offload, iSCSI, and/or RDMA operations, for example. The NIC 110 may be referred to a virtualization-aware NIC because communication with each VM may occur by an independent set of queues. The NIC 110 may determine the right address or combination of address information, such as, for example, VLAN address, L2 MAC address, L3 IP address, L4 address, L4 port, among others, to be used in order to select the right target VM. For instance, the NIC 110 may determine the MAC address of received packets and may transfer the received packets to an RX queue that corresponds to the VM with the appropriate MAC address. Similarly, the NIC 110 may enable transfer of packets from the VMs to the network by coordinating and/or arbitrating the order in which packets posted for transmission in TX queues may be transmitted. In this regard, the NIC 110 is said to enable direct input/output (I/O) or hypervisor bypass operations.

Some embodiments of the invention may comprise the NIC 110 that may allow validation, correction, and/or generation of, for example, MAC addresses or VLAN tags or IP addresses or attributes like TOS bits in an IP header. For example, the NIC 110 may detect that a VM may request a packet to be sent with a wrong source MAC address. The NIC 110 may validate a source MAC address by, for example, comparing the source MAC address for a packet with MAC addresses that may be associated with specific VM or buffers, and/or packet types.

The NIC 110 may flag the wrong source MAC address as an error to the TVM and/or to the VM, and may discard the packet. Another embodiment of the invention may enable the NIC 110 to overwrite the incorrect parameter or attribute, for example, the source MAC address for the packet from a VM with a correct source MAC address, and proceed with transmitting the packet. Similarly, an appropriate source MAC address may be generated for each packet from the VMs without validating the source MAC address. Accordingly, an application program running on a VM may not need to generate a source MAC address as the NIC 110 may write the source MAC address. The NIC 110 may also monitor use of bandwidth and/or priority per VM. The NIC 110 may, for example, allocate bandwidth limits or frames per VM, and/or ensure that VM or applications or flows associated with a VM do not claim priority different than that assigned by the administrator and/or TVM.

The NIC processor 118 may comprise suitable logic, circuitry, interfaces, and/or code that may enable control and/or management of the data processing and/or networking operations in the NIC 110. The NIC memory 116 may comprise suitable logic, circuitry, and/or code that may enable storage of data utilized by the NIC 110. The NIC 110 may be shared by a plurality of VMs 102a, 102b, and 102c. In some embodiments of the invention, network protocol operations may be offloaded to the NIC 110 and handled by the NIC 110. The offloaded network protocol operations may comprise OSI layer 3, 4, and/or 5 protocol operations, such as, for example, TCP and/or IP operations. The NIC may also execute link layer network protocol operations, which may be, for example, OSI layer 2 protocol operations, for example, a VLAN.

Accordingly, the NIC 110 may be a shared resource for the plurality of VMs. The operations of the VMs and the NIC may be coordinated by the TVM 102d and the hypervisor 104. Operation of a VM and a NIC may comprise copying data between a VM and the NIC. This may be accomplished by the NIC when the VM communicates to the NIC an address of a buffer or a reference to an address of a buffer to be accessed in that VM. The address may be a physical address or a virtual address. A virtual address may be translated to a physical address via, for example, an address translation table or a memory management unit. The means of address translation may be design and/or implementation dependent.

The L2 switch 130 may comprise suitable logic, circuitry, and/or code that may enable the NIC 110 to support packet communication between a VM and the network and/or between VMs, for example. Placing switching functionality in the NIC 110 may, for example, reduce end-to-end latency when transmitting or receiving packets. The L2 switch 130 may support unicast, broadcast, and/or multicast operations. Unicast operations may refer to packet transmissions to a single MAC address. Broadcast operations may refer to packet transmissions to all MAC addresses. Multicast operations may refer to packet transmission to a particular group of MAC addresses.

For example, the VM 102a may send a packet to at least one device communicatively coupled to the network. In this instance, the virtual NIC driver 126a may transfer the packet to a TX queue corresponding to the VM 102a. The L2 switch 130 may receive the packet from the appropriate TX queue and may determine that the destination MAC address or addresses correspond to a device or devices on the network. The NIC 110 may then communicate the packet to the network.

In another example, the VM 102a may have a data packet to transmit to the VM 102b and/or the VM 102c. In this instance, the virtual NIC driver 126a may place the data packet on a transmit queue corresponding to the VM 102a. The L2 switch 130 may receive the data packet from the queue and may determine that the destination MAC address may correspond to the VM 102b. The NIC 110 may place, for example, the data packet in to a receiver queue corresponding to the VM 102b. The virtual NIC driver 126b may be notified of the data packet in the queue via an event queue and the virtual NIC driver 126b may copy the data packet for use by an application program on the VM 102b.

The NIC 110 may also comprise the physical address validator 132. The physical address validator 132 may comprise suitable logic, circuitry, and/or code that may enable the validation of the address of a buffer posted by a virtual NIC driver to store a received packet. For example, before a packet in a receiver queue is transferred to a posted buffer, the physical address validator 132 may validate that the posted buffer is in an address or memory location that corresponds to the VM associated with the received packet. When the address is validated, the received packet may be transferred from the receiver queue to the posted buffer. If the physical address cannot be validated, the NIC 110 may notify, for example, the TVM and/or the hypervisor and/or the main driver 124 and/or virtual NIC driver 126a. Accordingly, the virtual NIC driver 126a may post a new buffer to receive the packet from the receiver queue or another action such as bringing down the virtual drive may be taken by the TVM and/or hypervisor. Similar validation for transmit buffer addresses can be performed by the NIC.

Figure 2:
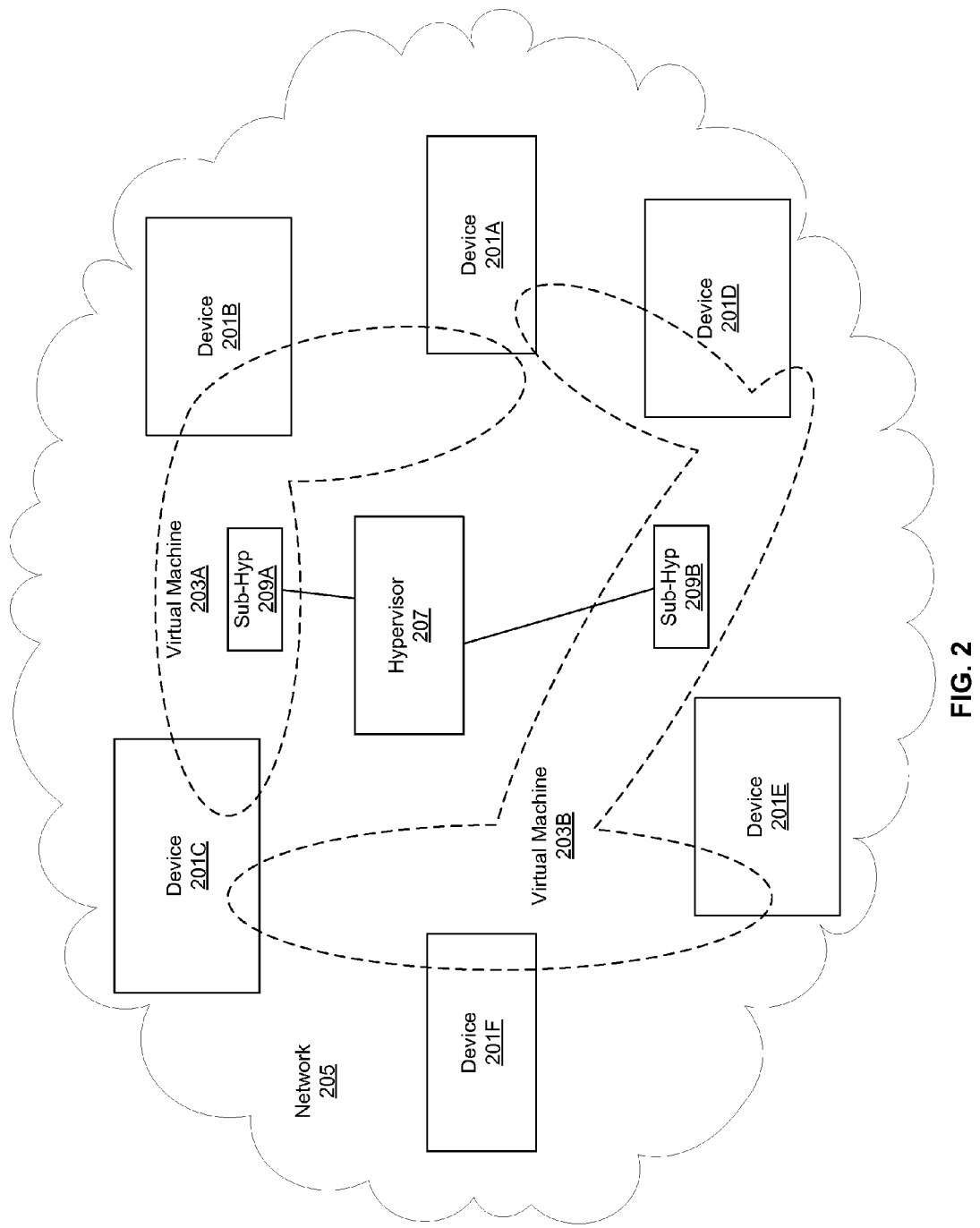
FIG. 2 is a diagram showing exemplary virtual machines abstracted over a network, in accordance with an embodiment of the invention.

FIG. 2 is a diagram showing exemplary virtual machines abstracted over a network, in accordance with an embodiment of the invention. Referring to FIG. 2, there is shown devices 201A-201F, virtual machines (VMs) 203A and 203B, a network 205, a hypervisor 207, and sub-hypervisors 209A and 209B.

The devices 201A-201F may comprise suitable circuitry, logic, interfaces, and/or code that may be operable to support the implementation of multiple virtual machines, such as the VMs 203A and 203B, and may comprise desktop computers, servers, switches, personal data assistants, smart phones, routers, racks, blades, mainframes, laptop devices and/or or any hardware that may support VM functionality. Various portions of the hardware requirements of the VMs 203A and 203B may be supported on a particular device based on the suitability of the device for that purpose, including metrics such as processor speed, storage space, current usage, network connectivity type, network bandwidth, and load balancing, for example.

The VMs 203A and 203B may comprise suitable circuitry, logic, interfaces, and/or code that may be operable to perform functions of a machine utilizing software. For example, a VM may comprise an operating system (OS), such as Windows XP, Linux, or the Mac OS, distributed across the network 205. The VMs 203A and 203B may be distributed over a plurality of devices in the network 205 and may be configured for optimum performance utilizing information regarding capabilities of the various devices used to support a particular VM. For example, a VM that may be utilized to perform intensive calculations may be partially supported by a device with high floating-point operations per second (FLOPs) processor capability.

The network 205 may comprise a local area network (LAN), a personal area network (PAN, an enterprise network, or any collection of devices in communication with each other and with the ability to be controlled by a single entity, for example.

The hypervisor 207 may comprise functionality similar to the hypervisor 104 described with respect to FIG. 1, but abstracted, or distributed, over the network 205. In this manner, various functionalities of the VMs 203A and 203B may be controlled while distributed over a plurality of devices, such as the devices 201A-201F. The hypervisor 207 may allocate hardware and software resources and also may enable data communication between the VMs and hardware resources in the devices 201A-201F. For example, the hypervisor 207 may enable communication between the VMs supported by devices 201A-201F. In another embodiment of the invention, the hypervisor 207 may control the overall operation of the VMs 203A and 203B, controlling the flow of information between the various devices supporting the VM, and may control the sub-hypervisors 209A and 209B in the VMs 203A and 203B, respectively, essentially comprising a networked hypervisor not tied to any one device.

The sub-hypervisors 209A and 209B may comprise suitable circuitry, logic, interfaces, and/or code that may be operable to control operations within a particular VM, while under the control of the hypervisor 207. The sub-hypervisors 209A and 209B may control sub-operations in the VMs 203A and 203B respectively. The sub-hypervisors 209A and 209B may communicate load information of network devices, in which a particular VM may be located, back to the hypervisor 207. The sub-hypervisors 209A and 209B may comprise an optional embodiment as a sub-set of the hypervisor 207 function per individual networked VM, such that VM management may be optimized for performance and reliability. The sub-hypervisor 209A and 209B may comprise control and management of memory, I/O coherence, buffers, cache, VM process state save, network interface of VM, for example, while the hypervisor 209 may comprise control and management of device resources, and actions such as VM creation, VM state save, VM state restoration, and VM deletion.

For the hypervisor 207 to be abstracted in the network 205, the devices 201A-201F may be aware of communication of information to and from processors in the devices 201A-201F as well as configurations of the various devices 201A-201F controlled by the hypervisor 207. One or more of the devices 201A-201F may be utilized to create the hypervisor 207. Communicated information may comprise the state of a VM and network 205 and device 201A-201F resources used by the VMs. In this manner, load balancing may be configured, optimizing the performance of the VMs 203A and 203B. For example, since the hypervisor 207 and the sub-hypervisors 209A and 209B may be distributed over the network 205, they may be network-aware as opposed to just aware of resources in a single device. Thus, the VM parameters may be shared among the devices 201A-201F, enabling the dynamic prioritization and resource allocation of the networked devices.

In operation, the VMs 203A and 203B may be enabled to operate utilizing a plurality of the devices 201A-201F. For example, the virtual machine 203A may be distributed over the devices 201A-201D, and the VM 203B may be distribute over the devices 201C-201F. The devices 201A-201F may be within the network 205, and may share VM parameters so that specified functions within the VMs may be executed within a device with preferred performance with respect to that function. For example, a device with high processor speed may be utilized for processor-intensive functions of the VM, and storage-intensive operations may be executed on devices local to the storage capacity to utilize a higher bandwidth connection to the storage capacity.

The hypervisor 207 may control the overall distribution and/or configuration of the functionality of the VMs, and may perform load balancing, managing resources in devices across the network 205, thereby enabling scaling and optimization of performance dependent on available network resources, for example. The hypervisor 207 may enable configuration of multiple VMs across the network 205, which would not be enabled with a non-abstracted hypervisor. The hypervisor 207 may control the VMs 203A and 203B via the sub-hypervisors 209A and 209B within the VMs. The communication and available resource parameters may be communicated to the VMs 203A and 203B via the hypervisor 207. The sub-hypervisors 209A and 209B may communicate the compute load of a particular VM to the hypervisor 207 so that it may configure resources to individual VMs based on the hypervisor 207 traffic awareness. Accordingly, because the VMs are distributed over networked resources, the VMs are scalable limited only by the resources available in the networked resources.

In an embodiment of the invention, a plurality of hypervisors, each with its own sub-hypervisor, may control the virtual machines.

Figure 3:
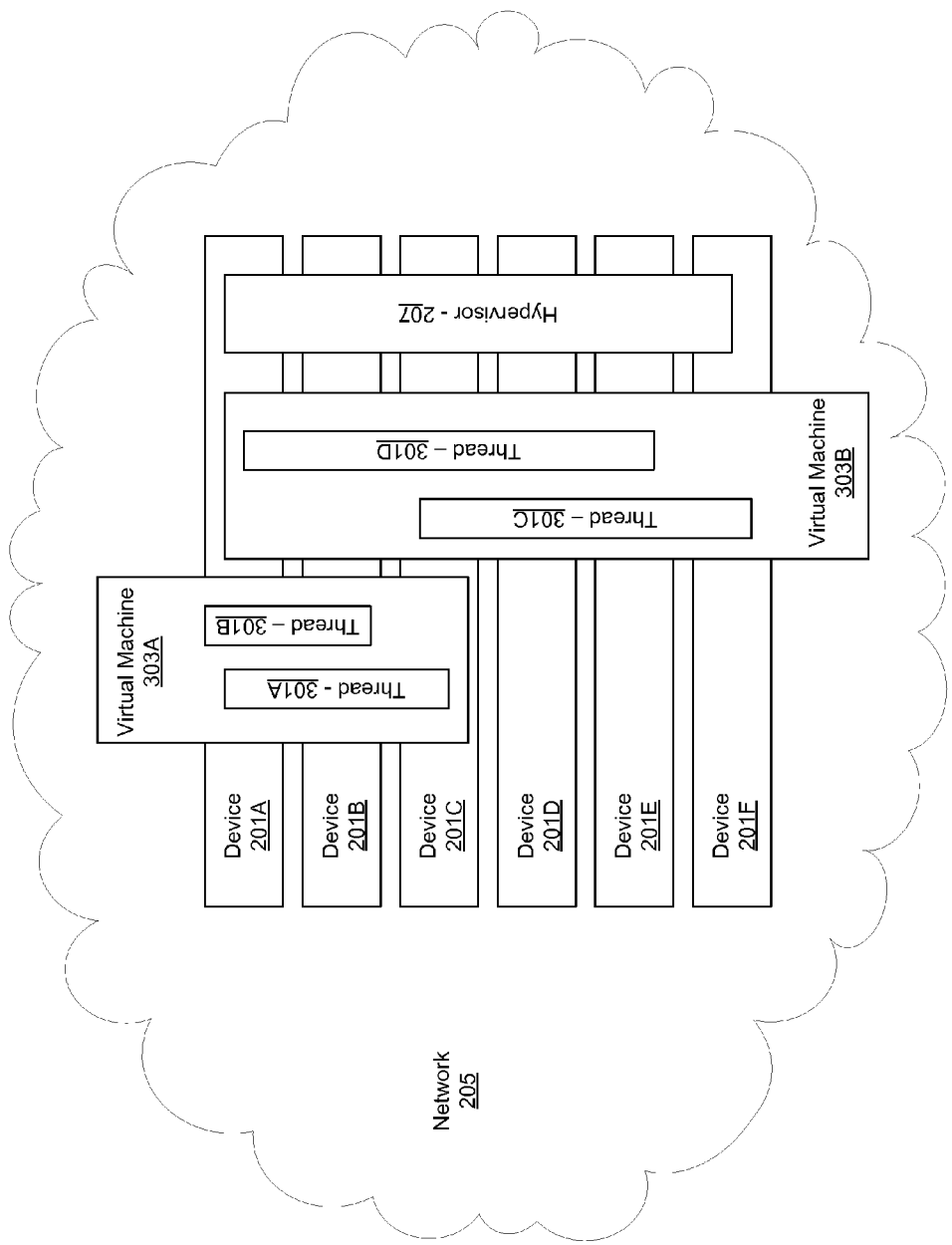
FIG. 3 is a diagram illustrating exemplary threads in abstracted virtual machines, in accordance with an embodiment of the invention.

FIG. 3 is a diagram illustrating exemplary threads in abstracted virtual machines, in accordance with an embodiment of the invention. Referring to FIG. 3, there is shown the network 205, the devices 201A-201F, and the hypervisor 207, which may be as described with respect to FIG. 2. There is also shown virtual machines 303A and 303B, which comprise threads 301A-301D. The threads 301A-301D may comprise the suitable circuitry, logic, and or code that may be operable to perform specific functions within the VMs. A VM may comprise a plurality of threads, such as the threads 301A and 301b in the VM 303A and the threads 301C and 301D in the VM 303B, for example.

In operation, the threads 301A-301D may be operable to execute various functions in the VMs 303A and 303B, and may be controlled by the hypervisor 207, which may be abstracted over the devices 201A-201F, for example. The threads may also be distributed over a plurality of devices. For example, the thread 301D may be distributed over the devices 201A-201E, and the thread 301A may be distributed over the devices 201A-201C. In this manner, resources from different devices may be utilized in a thread in a VM to optimize performance and to load balance. For example, if a function in a VM requires significant processing capability, a thread may be configured to reside partially on a device comprising suitable processor power. The configuration of the threads 301A-301D may be dynamically controlled by the hypervisor 207, and may be adjusted based on changing network or resource utilization conditions, for example. In another exemplary embodiment, energy usage may be utilized for control of the VMs. For example, devices may be turned on/off to use more/less power based on VM computing demands from the networked hypervisor.

Figure 4:
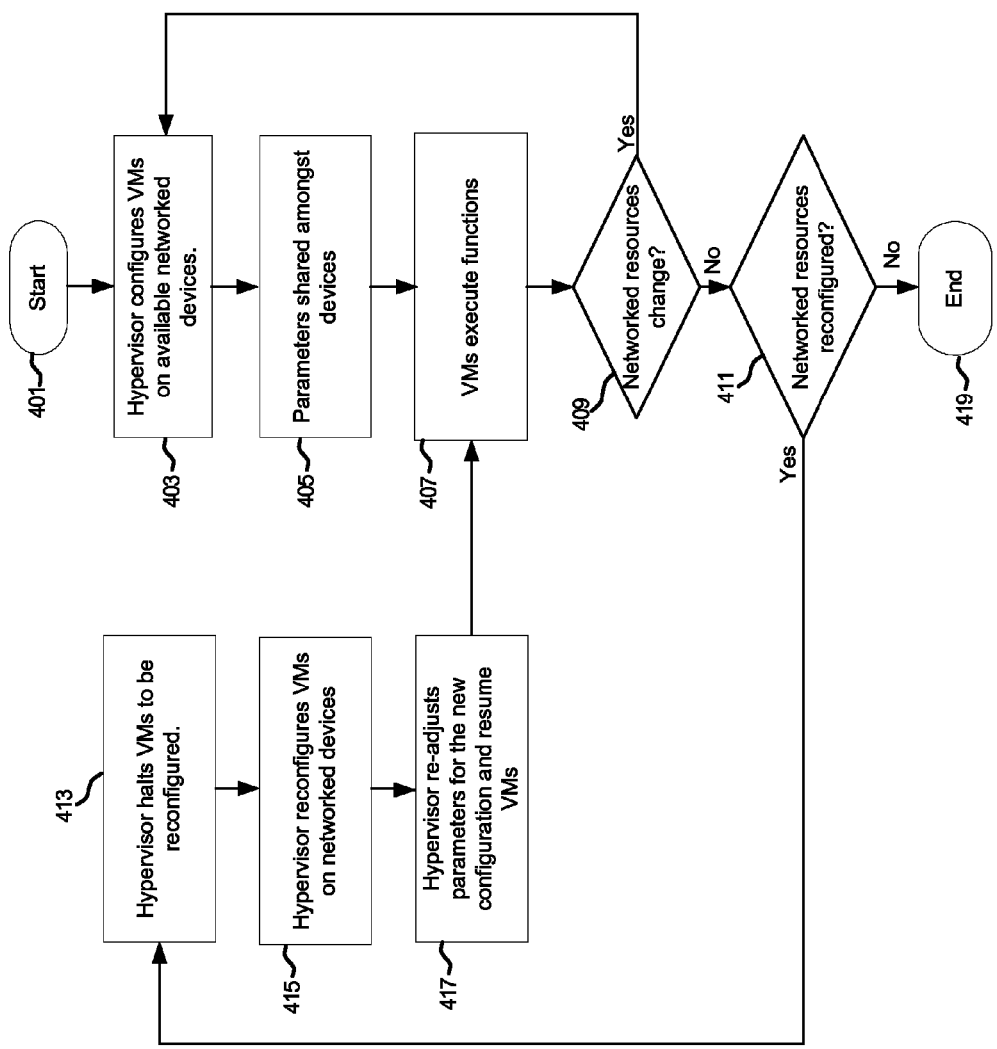
FIG. 4 is a block diagram illustrating exemplary steps for abstracted virtual machines, in accordance with an embodiment of the invention.

FIG. 4 is a block diagram illustrating exemplary steps for abstracted virtual machines, in accordance with an embodiment of the invention. Referring to FIG. 4, in step 403 after start step 401, the hypervisor 207 may configure VMs over the available networked devices. In step 405, the parameters established for the VMs may be shared amongst the networked devices, followed by step 407, where the VMs execute their desired functions. If, in step 409, the networked resources do not change, the exemplary steps may proceed to step 411, but if resources or VM compute needs do change, the exemplary steps may return to step 403.

In step 411, if network resources are to be reconfigured, the process may proceed to step 413 where the hypervisor may halt the VM, followed by step 415 where the hypervisor may reconfigure VMs on the networked devices based on the reconfigured networked resources. The hypervisor 207 may re-configure VMs based on network traffic. For example, in instances where the sub-hypervisor 209B detects VM 203B's network traffic between device 201F and 201D to be high enough for the device 201D VM resources to be re-located to the device 201F, assuming VM resources are available in the device 201F, to optimize inter-device communication within the VM 203B. In step 417, the hypervisor may readjust the parameters for the new configuration and then resume the VMs. The exemplary steps may then proceed to step 407. If, in step 411, the networked resources are not to be reconfigured, the exemplary steps may proceed to end step 419.

In an embodiment of the invention, a method and system are disclosed for abstracting virtual machines in a network. In this regard, one or more processors and/or one or more circuits may be operable to configure one or more virtual machines 203A, 203B, 303A, and 303B and a hypervisor 207 for controlling the one or more virtual machines 203A, 203B, 303A, and 303B. The one or more virtual machines 203A, 203B, 303A, and 303B and the hypervisor 207 may be distributed across the plurality of network devices 201A-201F. A sub-hypervisor 209A and 209B may be configured within each of the one or more virtual machines 203A, 203B, 303A, and 303B utilizing the hypervisor 207. Load information of the networked devices 201A-201F may be communicated to the hypervisor 207 utilizing the sub-hypervisors 209A and 209B. The one or more virtual machines 203A, 203B, 303A, and 303B may comprise one or more threads 301A-301D.

The one or more virtual machines 203A, 203B, 303A, and 303B may be load balanced utilizing the hypervisor 207. The one or more virtual machines 203A, 203B, 303A, and 303B may be dynamically configured utilizing the hypervisor 207 based on changes in the network devices 201A-201F, such as network connectivity and application needs, for example, and may be scaled by the distribution of the one or more virtual machines 203A, 203B, 303A, and 303B across the plurality of network devices 201A-201F. One or more of the one or more virtual machines 203A, 203B, 303A, and 303B may comprise an operating system. The network devices 201A-201F may comprise a plurality of: servers, switches, routers, racks, blades, mainframes, personal data assistants, smart phones, desktop computers, and/or laptop devices.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for abstracting virtual machines in a network.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. For example, a computer system that embodies a hypervisor and sub-hypervisors may reside in network switches/routers. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. A data processing system comprising:
    a plurality of hardware network devices in data communication in a network;
    one or more virtual machines, each respective virtual machine including a plurality of code portions which, in aggregate, perform functions of the each respective virtual machine, the plurality of code portions of the each respective virtual machine being distributed across a respective subset of the plurality of hardware network devices, the one or more virtual machines being configured for optimum performance of the one or more virtual machines using information regarding capabilities of respective hardware network devices of the plurality of hardware network devices to support the each respective virtual machine;

a hypervisor including a group of code portions distributed over a like group of hardware network devices of the plurality of hardware network devices and configured to manage data communication between respective virtual machines of the plurality of virtual machines; and a plurality of sub-hypervisors, each respective sub-hypervisor of the plurality of sub-hypervisors in data communication with the hypervisor and being associated with a respective virtual machine of the plurality of virtual machines, wherein the hypervisor is configured to communicate available resource parameters to a respective virtual machine of the plurality of virtual machines via a respective sub-hypervisor and the respective sub-hypervisor is configured to communicate a compute load of the respective virtual machine to the hypervisor.

2. The data processing system of claim 1 wherein the hypervisor is configured to allocate hardware and software resources of the plurality of hardware network devices among the one or more virtual machines.

3. The data processing system of claim 2 wherein the hypervisor is configured to share operational parameters of the respective virtual machines of the plurality of virtual machines to dynamically reallocate the hardware and software resources of the plurality of hardware network devices among the one or more virtual machines as availability of network resources changes.

4. The data processing system of claim 1 wherein the hypervisor is configured to enable data communication between the respective virtual machines of the one or more virtual machines and hardware resources of the plurality of hardware network devices.

5. The data processing system of claim 1 further comprising:

a sub-hypervisor of the plurality of sub-hypervisors within each virtual machine of the plurality of virtual machines, the sub-hypervisor configured for data communication with the hypervisor to control one or more sub-processes implemented by the each virtual machine.

6. The data processing system of claim 5 wherein the sub-hypervisor includes multiple code portions distributed across more than one hardware network device of the plurality of hardware network devices.

7. The data processing system of claim 1 wherein the hypervisor is configured to receive respective operating parameters of the respective hardware network devices and further configured to control distribution of selected code portions of the plurality of code portions, the selected code portions implementing virtual machine processes of the one or more virtual machines among the plurality of hardware network devices.

8. The data processing system of claim 7 wherein the hypervisor is configured to balance a processing load for the virtual machine processes among the plurality of hardware network devices using the received respective operating parameters of the respective hardware network devices.

9. The data processing system of claim 7 wherein the hypervisor is configured to optimize performance of respective virtual machine processes among the plurality of hardware network devices using the received respective operating parameters of the respective hardware network devices.

10. A data processing system comprising:

a plurality of hardware network devices in data communication in a network;

one or more virtual machines, each respective virtual machine including code which is distributed across a respective subset of the plurality of hardware network devices to perform functions of the respective virtual machine in conjunction with the respective subset of the plurality of hardware network devices, each respective virtual machine comprising one or more threads operative to perform defined operational functions of the respective virtual machine;

a hypervisor including code distributed over a group of hardware network devices of the plurality of hardware network devices and configured to control the one or more threads of each respective virtual machine of the plurality of virtual machines; and a sub-hypervisor within each virtual machine of the plurality of virtual machines, the sub-hypervisor configured for data communication with the hypervisor to control one or more sub-processes implemented by the each virtual machine;

wherein the hypervisor is configured to dynamically vary configuration of the one or more threads over the one or more subsets of the hardware network devices according to changing network utilization or hardware network resource availability.

11. The data processing system of claim 10 wherein the hypervisor is configured to receive from the respective hardware network devices of the plurality of hardware network devices respective operating parameters of the respective hardware network devices and further configured to control distribution of virtual machine processes of the one or more virtual machines among the plurality of hardware network devices.

12. The data processing system of claim 11 wherein respective threads of the one or more threads are functionally distributed over one or more subsets of the plurality of hardware network devices to match performance requirements of the respective threads with performance capabilities of respective hardware network devices.

13. The data processing system of claim 12 wherein the hypervisor is configured to control distribution of the one or more threads over the one or more subsets of the hardware network devices.

14. A method comprising:

at a plurality of hardware network devices in data communication over a network, implementing a plurality of virtual machines, respective virtual machines of the plurality of virtual machines including a plurality of code portions, a plurality of code portions in aggregate forming a respective virtual machine, the plurality of code portions being distributed over respective subsets of hardware network devices; and at the plurality of hardware network devices, implementing a hypervisor in data communication with the respective virtual machines to control the plurality of virtual machines, including distributing respective portions of hypervisor code among the respective hardware network devices, allocating resources of the plurality of hardware network devices among the plurality of virtual machines based on suitability of a respective subset of hardware network devices for performing functional tasks of a respective virtual machine;

communicating operational parameters of the respective virtual machines of the plurality of virtual machines;

dynamically reallocating hardware and software resources of the plurality of hardware network devices among the one or more virtual machines based on the communicated operational parameters; and at the plurality of hardware network devices, implementing a sub-hypervisor within each virtual machine of the plurality of virtual machines, the sub-hypervisor configured for data communication with the hypervisor to control one or more sub-processes implemented by the each virtual machine.

15. The method of claim 14 wherein implementing a hypervisor further comprises:

optimizing performance of respective virtual machine processes among the plurality of hardware network devices using the communicated operational parameters of the respective virtual machines.

16. The method of claim 14 wherein implementing a hypervisor comprises:

distributing, by the hypervisor, respective portions of a plurality of threads across respective subsets of the plurality of hardware network devices according to functional capability of hardware network devices of the respective subsets of the plurality of hardware network devices and according to processing requirements of the plurality of threads.

\* \* \* \* \*